United States Patent [19]
Floren et al.

[11] Patent Number: 5,020,934
[45] Date of Patent: Jun. 4, 1991

[54] CORROSION RESISTANCE FOR FIRE HYDRANT STEM SAFETY COUPLING

[75] Inventors: Carl E. Floren, Decatur, Ill.; Mike Weller, House Springs, Mo.; Timothy M. Logman, Monticello, Ill.

[73] Assignee: Mueller Co., Decatur, Ill.

[21] Appl. No.: 524,032

[22] Filed: May 16, 1990

[51] Int. Cl.⁵ ................................................ B25G 3/00
[52] U.S. Cl. ...................................... 403/306; 403/2; 403/404
[58] Field of Search .................... 403/2, 404, 306, 305, 403/300; 285/55; 411/903

[56] References Cited
U.S. PATENT DOCUMENTS 3,439,947 4/1969 Luckenbill et al. .................... 403/2
4,114,505 9/1978 Loeser et al. ................... 411/903 X Primary Examiner—Andrew V. Kundrat
Attorney, Agent, or Firm—Cushman, Darby & Cushman

[57] ABSTRACT

A corrosion resistant valve stem coupling for use in selected fire hydrants whose water valves are frequently opened and closed. The valve stem coupling is coated with a compressible, non-oxidizable, corrosion protection coating which does not oxidize and is not worn off in situations of repeated use. In one embodiment, the compressible coating is a nylon coating applied to the valve stem coupling with a fluid-bed, powder coating method.

16 Claims, 2 Drawing Sheets

CORROSION RESISTANCE FOR FIRE HYDRANT STEM SAFETY COUPLING

BACKGROUND OF THE INVENTION

1. Field of the Invention

This invention relates to a coupling for a two-part valve stem used in fire hydrants and a method for making the coupling. More particularly, this invention relates to improving the durability and corrosion resistance of the coupling and its securing pins.

2. Prior Art Valve Stem Couplings

A fire hydrant's water valve is buried deep underground. In order to allow this valve to be operated from the surface, a long valve stem extends from the valve up to the surface.

When an above ground portion of a fire hydrant is knocked over, broken, or dislodged, the valve stem can be ripped from the valve, twisted, bent, or otherwise damaged. Furthermore, the force on the valve stem may cause damage to the water valve itself. Therefore, in order to minimize damage to the valve and to facilitate inexpensive and easy repair after such an accident, fire hydrants typically employ two-part valve stems.

U.S. Pat. No. 3,439,947 issued to Luckenbill et al shows one type of such a two-part valve stem. The valve stem comprises a lower valve stem and an upper valve stem. The lower valve stem leads from the water valve up to a level just beneath the surface of the ground. The upper part of the valve stem leads from the top of the lower valve stem up into the fire hydrant above ground. These two parts of the valve stem are connected via a coupling which is designed to yield or tear before the lower valve stem and/or water valve can be damaged.

As is shown in U.S. Pat. No. 3,439,947, such a coupling is usually a cylindrical shaped collar which simultaneously fits over the top end of the lower valve stem and the bottom end of the upper valve stem. The coupling is attached to both parts of the valve stem by two transverse pairs of aligned apertures. The upper pair of apertures and an accompanying upper securing pin connect the coupling to the upper valve stem. The lower pair of apertures and a lower securing pin connect the coupling to the lower portion of the valve stem.

It has been recognized that if the coupling fails at the lower apertures, the coupling will break away from the lower valve stem. Replacement of the upper valve stem is then considerably easier because the coupling is easily removed from the hydrant because it is attached to the upper part of the valve stem. After the coupling is torn from the lower securing pin, the lower securing pin is left fitting loosely in the lower valve stem. The lower securing pin is then also easily removed.

In order to ensure that the coupling fails before the valve stem or the securing pins, the coupling is made of a low ductility material such as the higher tensile strength versions of low carbon steel. The securing pins, on the other hand, are made of a comparatively tougher material such as stainless steel. The coupling will therefore rip or tear before the securing pins.

To ensure that the coupling will rip from the lower securing pin and not fail elsewhere first, the portion of the coupling surrounding the lower apertures is made especially weak. For example, a notch is provided in the bottom end of the coupling so that less coupling steel exists between the securing pin and the bottom of the coupling. The lower securing pin should normally rip from the coupling before the coupling fails elsewhere.

In the field, such couplings often encounter highly corrosive water. Because the couplings are made of low carbon steel, they corrode quickly when exposed. The steel of the couplings are therefore often protected with a corrosion resistant plating of zinc or cadmium. Such presently known couplings are widely used in fire hydrants and are widely believed to function well in common hydrant environments.

SUMMARY OF THE INVENTION

We have identified certain environments, however, in which the commonly used metal plated coupling corrodes prematurely. In applications where the water valve is repeatedly opened and closed, the corrosion protective surface of presently used couplings may require replacement due to corrosion. Where fire hydrants are used to fill tank trucks, for example, repeated alternating stresses developed between couplings and securing pins have caused couplings to corrode in the area surrounding the securing pins.

The plated type coating is a sacrificial coating. This plating protects the steel from rusting by rusting itself. Because oxidized plating is not as durable as unoxidized plating, repeated use of the coupling quickly wears the oxidized plating from the surface of the unoxidized plating. Another layer of plating then is oxidized by the corrosive water. Subsequent use of the hydrant in turn wears this oxidized plating from the coupling. Accordingly, layer after layer of plating is oxidized and removed from the coupling. Eventually, the plating is pierced and the underlying metal is exposed.

The underlying metal then corrodes quickly by either or both of two mechanisms. First, the metal may simply rust. This rusting occurs at a rapid rate. Second, if the metal is steel, the steel may undergo galvanic corrosion. Steel is anodic to stainless steel, therefore, the direct contact between the stainless steel pins and a low carbon steel coupling results in galvanic corrosion between the two.

In view of these problems with presently known couplings, this invention provides a corrosion resistant coupling suitable for use in frequently used fire hydrants. The present invention's coupling is coated with a yieldable or compressible organic polymer using a fluidized-bed, powder coating technique. The polymer is thereby applied to all surfaces of the coupling including the inside surfaces of the apertures. When repeated opening and closing of the water valve occurs, the nylon does not oxidize and therefore is resistant to wear as the nylon between the pins and the apertures merely compresses and deforms when the coupling is stressed by use.

BRIEF DESCRIPTION OF THE DRAWINGS

The present invention is depicted in the accompanying drawing in which.

DETAILED DESCRIPTION OF THE PREFERRED EMBODIMENTS

Figure 1:
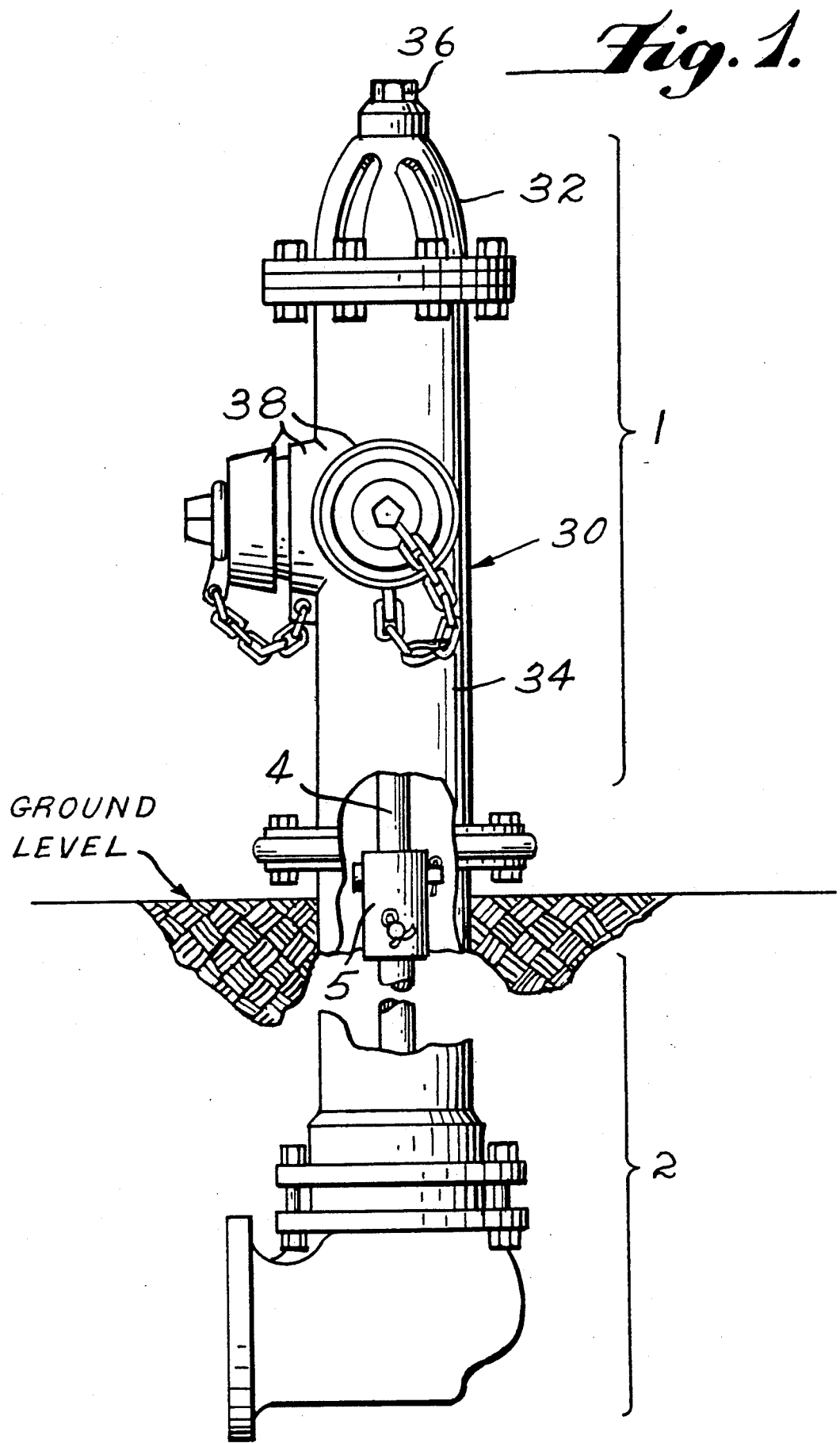
FIG. 1 is a side view, partly in cross-section, of a fire hydrant assembly.

FIG. 1 shows the present invention's use of a compressible nylon coated coupling 5 in relation to the portion of a fire hydrant assembly above ground level 1 and the portion of a fire hydrant assembly below ground level 2. The hydrant 30 is of conventional construction and includes a cap 32 bolted on a housing 34. The upper stem 4 engages a rotating mechanism carried within cap 32 so that rotation of external nut 36 will be transmitted to axial movement of the stem 4. Conventionally, one or more capped outlet ports 38 are provided.

Figure 2:
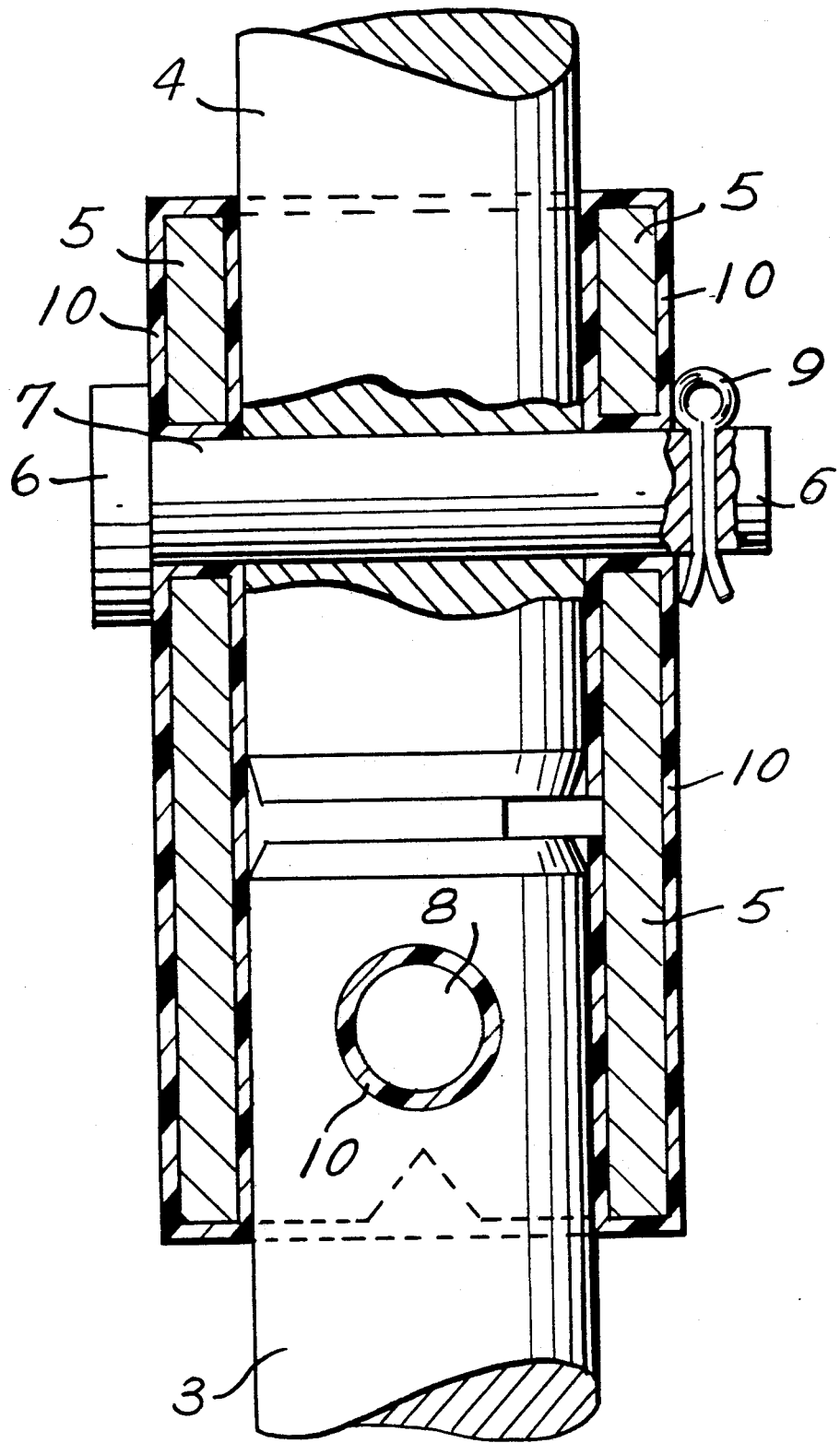
FIG. 2 is a cross-sectional side view of one embodiment of the valve stem coupling assembly showing the side surface of the coupling coated with compressible nylon.

FIG. 2 is a more detailed view of the invention's use of the compressible organic polymer coating on a two-part valve stem coupling assembly. The lower part of the valve stem 3 is joined to the upper part of the valve stem 4 with coupling 5 and a two securing pins. In this figure, upper securing pin 6 is shown in place in the upper pair of aligned apertures 7. In this embodiment the securing pins are clevis pins. Accordingly, a cotter pin 9 is shown holding the upper securing pin 6 in place. For illustrative purposes, the lower securing pin is not shown. Rather, lower pair of aligned apertures 8 is shown open. A compressible coating 10 is shown covering the entire coupling. Looking into the lower pair of apertures 8, the coating 10 can be seen to be protecting the inside of the apertures. Similarly, the inside of the upper apertures 7 is also shown to be coated.

According to the preferred embodiment, this compressible protective coating is a yieldable or compressible organic polymer such as a nylon, polypropylene or high density polyethylene coating. Nylon 11 is preferably used due to its low water absorption characteristic. Although nylon coating thicknesses within the range of 0.005 inches and 0.100 inches are usable, a thickness of 0.010 inches has been found to perform most effectively.

Application of the coating by a hot, fluidized bed process is preferred as a substantially uniform coating of a the polymer powder can be applied relatively inexpensively. The couplings are dipped into the bed and the coating thickness is primarily controlled by the dwell period in the bed. Alternatively, electrostatic coating may also be used. In either case, the tightness of the fit between the stem ends and the coated coupling will be improved thereby minimizing potentially damaging play between the coupling and the stems.

It may seem that thermosetting epoxies would also provide equally good non-oxidizing protective coatings for frequently used couplings. This, however, is not the case.

First, we have found that the epoxy coating in the area of the apertures is likely to chip when the securing pins are inserted. Because epoxy tends to flow unevenly into the apertures during the fluid-bed, powder coating process, the inside of the apertures are left with an uneven coating. Forcing the securing pins into apertures coated with rigid epoxy causes the epoxy to chip.

Although the nylon also flows unevenly into the apertures, the nylon or other polymers noted above are compressible and may exhibit useful ductility. The nylon coating on the inside of the apertures therefore merely deforms when the securing pins are inserted. The nylon coating is sufficiently tough that it is not torn from the underlying steel and the corrosion resistant barrier is not pierced.

Second, the normal shocks and loads put on the coupling during repeated use may also chip the epoxy coating. When the valve stem is pushed and pulled during manipulation of the water valve, the snapping action of the securing pins in the apertures is likely to chip the epoxy coating. The nylon coating, on the other hand, is compressible. The nylon cushions and absorbs these shocks and therefore does not chip or rupture.

Furthermore, it turns out that applying this invention's nylon coating is less expensive than applying an epoxy coating.

While the invention has been described in connection with what is considered to be the most practical and cost effective embodiment, it is to be understood that the invention is not limited to the disclosed embodiment but, on the contrary, is intended to cover various modifications and equivalent arrangements included within the spirit and scope of the appended claims. For example, other embodiments of couplings which suffer corrosion damage due to repeated use may be coated with nylon as disclosed here. Furthermore, the coupling may be made of another inexpensive but ductile material suitable for couplings such as cast ductile iron, malleable iron, cast steel, and the like.

Therefore, persons of ordinary skill in the art of fire hydrant design are to understand that all such equivalent structures and methods for protecting couplings from corrosion due to repeated use are included within the scope of the following claims.

We claim:

1. A valve stem coupling comprising a length of metallic tube, the tube having a longitudinal axis, a first pair of apertures in the tube, and a second pair of apertures in the tube, the first pair of apertures being aligned with one another at a first location, the second pair of apertures being aligned with one another at a second location spaced from said first location, the tube having a coating of an organic polymer that is compressible with the inside of the apertures also coated with said organic polymer coating.

2. The valve stem coupling of claim 1 wherein said organic polymer is selected from the group consisting of nylon, polypropylene and polyethylene.

3. The valve stem coupling of claim 1 wherein the metallic tube is a low carbon steel tube.

4. The valve stem coupling of claim 1 wherein the surface of the metallic tube is zinc plated.

5. The valve stem coupling of claim 1 further comprising first and second removable securing pin means, each of the pin means being longer than the diameter of the tube, the first pin means being removably inserted into the pair of apertures so that each end of the first pin means is outside the tube, the second pin means being removably inserted into the second pair of apertures so that each end of the second pin means is outside the tube.

6. The valve stem coupling of claim 5 wherein the first and second securing pin means are made of stainless steel.

7. The valve stem coupling of claim 5 wherein the first and second securing pin means are clevis pins, each of the clevis pins having a cotter pin removably inserted through one end thereof for retaining the same in position in its pair of apertures.

8. A fire hydrant valve stem coupling for connecting an upper valve stem to a lower valve stem in situations where the valve stem is urged to operate the valve mechanism, comprising a coupling means in the form of a length of metallic tube, the tube having a first pair of apertures and a second pair of apertures, the first pair of apertures being aligned by a first axis of alignment which intersects the longitudinal axis of the tube perpendicularly at a first location along the axis of the tube, the second pair of apertures being aligned by a second axis of alignment which intersects the longitudinal axis of the tube perpendicularly at a second location along the axis of the tube;

first removable securing pin means for securing the upper valve stem to the coupling means, the first pin means being longer than the diameter of the tube, the first pin means being removably inserted through the first pair of apertures and through a part of the upper valve stem inside the tube so that each end of the first pin means is outside the tube;

second removable securing pin means for securing the lower valve stem to the coupling means, the second pin means being longer than the diameter of the tube, the second pin means being removably inserted through the second pair of apertures and through a part of the lower valve stem inside the tube so that each end of the second pin means is outside the tube; and a compressible, non-corroding, shock absorbing coating means for absorbing shocks between the apertures and the pin means when the valve stem is operated thereby providing a durable corrosion protective surface to the coupling means, the coating means coating at least the inside of the apertures of the coupling means.

9. The fire hydrant valve stem coupling of claim 8 wherein the coating means is an organic polymer.

10. The fire hydrant valve stem coupling of claim 9 wherein the polymer is selected from the group consisting of nylon, polypropylene and polyethylene.

11. The fire hydrant valve stem coupling of claim 8 wherein the coupling means is made of low carbon steel.

12. The fire hydrant valve stem coupling of claim 8 wherein the first and second securing pin means are made of stainless steel.

13. A method of protecting a fire hydrant coupling from corrosion comprising the step of applying a compressible organic polymer coating to said coupling.

14. The method of claim 13 wherein said coating is applied by the fluidized-bed powder coating process.

15. The method of claim 13 wherein said coating is applied to a thickness within the range of 0.005 inches to 0.100 inches.

16. The method of claim 13 wherein said polymer is nylon 11.

* * * * *